July 20, 1971  R. E. ERICKSON ET AL  3,594,251
PROCESS FOR PRODUCING FLEXIBLE FOAM CUSHIONING
Filed July 10, 1968
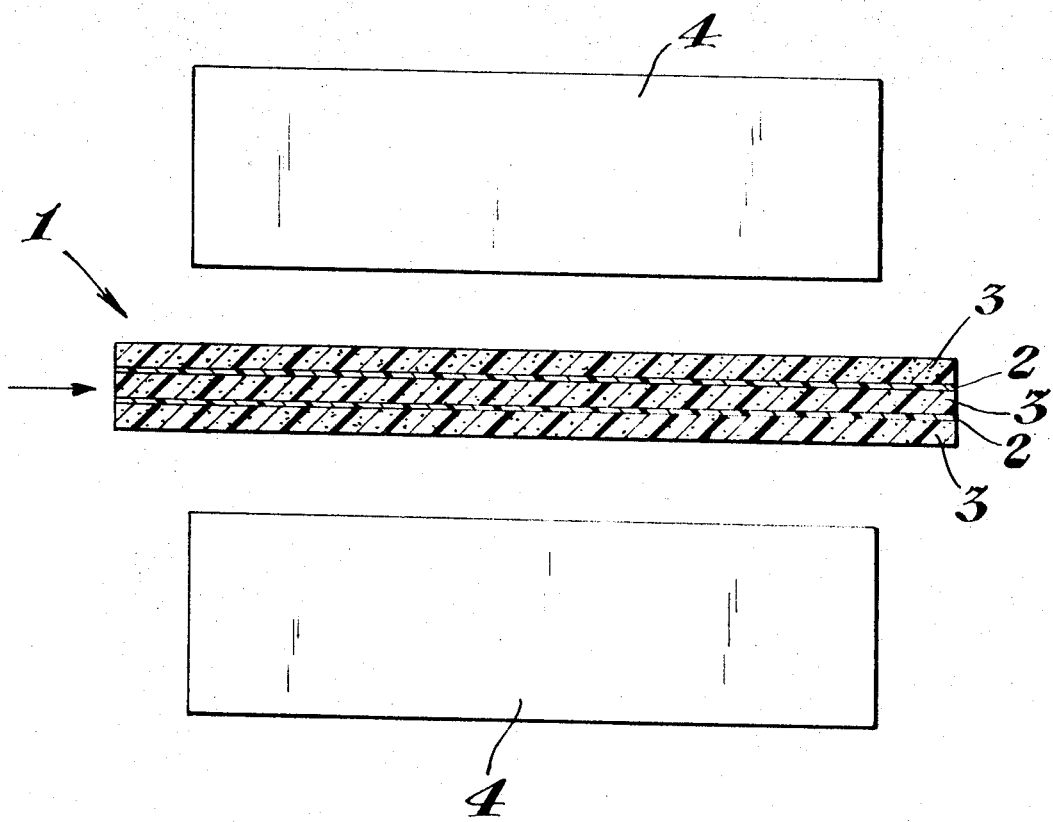
INVENTORS.
Robert E. Erickson
BY David P. Sheetz
Griswold & Burdick
ATTORNEYS

United States Patent Office 3,594,251
Patented July 20, 1971

---

3,594,251
PROCESS FOR PRODUCING FLEXIBLE FOAM CUSHIONING
Robert E. Erickson and David P. Sheetz, Midland, Mich., assignors to The Dow Chemical Company, Midland, Mich.
Filed July 10, 1968, Ser. No. 743,591
Int. Cl. B29c 27/04
U.S. Cl. 156—273                                         11 Claims

ABSTRACT OF THE DISCLOSURE

Thick slabs of latex foams requiring substantially shorter drying periods are prepared by (1) layering in sandwich fashion thin cured slabs of latex foam coated at each slab interface with a latex adhesive and (2) curing the adhesive line at each interface by dielectric heat.

BACKGROUND OF THE INVENTION

This invention relates to the lamination of latex foams, and more particularly, to the production of relatively thick slabs of such latex foams by laminating several thin layers of the foam one to another with a latex adhesive.

Synthetic and natural rubber latex foams have been utilized extensively in the production of cushioning articles such as seat cushions and mattresses. However, the high processing costs involved in drying and curing the relatively thick continuous slab latex foam which otherwise would be preferred over molded core stock for various cushioning applications have restricted the usage of the slab latex foam.

Conventionally, latex foam slabs are prepared from a polymer in the form of an aqueous emulsion also containing gelling agents, vulcanizing agents and other formulating ingredients by the method described in Madge, E. W., "Latex Foam Rubber," Chap. 7, John Wiley & Sons, Inc., New York (1962). While the costs of preparing slabs having thicknesses less than one inch by this method are not unreasonable, the increased costs resulting from the prolonged drying times required for slabs having thicknesses required by the cushioning industry, i.e. about 2 to 6 inches, are virtually prohibitive.

In an alternative method the wet froth of the latex is spread onto a traveling belt, and while on this belt is subjected to the Talalay procedure of freezing, exposure to carbon dioxide, thawing, and vulcanization. Thick foams prepared by this method also require unreasonably long drying times.

Recently new synthetic latex foams which comprise latexes of polymers having reactive substituent groups and water-dispersible materials coreactive therewith and a method for their preparation have been described by U.S. 3,215,647. Due to their ease of processing, their excellent properties such as color, good resilience and durability, these foams hold even greater promise in the cushioning industry. These foams, which are not coagglomerated by conventional gelling means such as steaming or adding coagulating agents, are dried and cured at the same time. While many steps such as squeezing, washing, and the like are eliminated, relatively long drying times are still required in the production of thick slabs. More importantly, exterior portions of slabs having thicknesses greater than 2½ inches tend to deteriorate as a result of the prolonged heating required to cure the interior portions of the foam. Since it is often not feasible or economical to produce thick slabs of latex foam by the conventional methods, it would be highly desirable to provide an economical methods for making relatively thick slabs of latex foam.

SUMMARY OF THE INVENTION

The present invention is an economical process for preparing a thick slab of latex foam, said thick slab comprising a plurality of thin layers of latex foam intimately adhered together with a latex adhesive, said process comprising the steps of (1) adjoining the thin layers in sandwich-like fashion such that a layer of the latex adhesive appears at each interface of the thin layers and (2) removing water from the latex adhesive by a dielectric heating means. The essence of this invention resides in the use of a latex adhesive to laminate the two or more layers of foam followed by removing water from the resulting adhesive line or lines with dielectric heat. For the purposes of this invention the term "latex" is defined as an aqueous colloidal dispersion of an organic polymer. When prepared by the method of this invention, slabs of latex foam having almost any thickness require drying and curing times no longer than those required to cure thin slabs of foams. Furthermore, the deterioration problems observed during the drying of thick slabs are completely avoided since the thick slabs made by this new method are really combinations of thin cured foam layers which do not require prolonged curing times. This method also provides a means of constructing variable load bearing modulus for engineered comfort foam cushioning.

Thick latex foam slabs prepared according to the method of this invention have high elasticity, good resilience, and improved softness under small initial compressions all of which are desired in supporting materials normally used in upholstery.

BRIEF DESCRIPTION OF THE DRAWING

The figure is a cross-sectional view of a thick slab of latex foam as it is passed between platens of a conventional dielectric heating apparatus.

Referring now to the drawing, there is depicted a thick slab 1 of latex foam comprising a plurality of thin layers 3 of latex foam intimately adhered together with a plurality of layers 2 of latex adhesive. The thick slab 1 is passed between platens 4 of a dielectric heating means to remove water from the latex adhesive.

DESCRIPTION OF THE PREFERRED EMBODIMENTS

Latex foams operable in the practice of this invention include the foams of natural rubber latexes, synthetic latexes, and mixtures thereof. Suitable synthetic latexes are those capable of being transformed into a wet froth and then cured to a durable foam which will adhere to a latex adhesive. Such synthetic latexes and methods for the preparation thereof are well known to those skilled in the art. A few of the latexes are latexes of polybutadiene, styrene/butadiene copolymers, butadiene/acrylonitrile copolymers, chloroprene homopolymers and copolymers, and so forth.

Preferred synthetic latex foams having very desirable properties such as durability, good color, good resiliency, good resistance to compress set and fatigue, heat aging resistance, and excellent load bearing qualities are prepared from the so-called reactive latex compositions comprising a polymer having at least one pendant reactive substituent group and intimately admixed therewith an aqueous or water-miscible solution or an aqueous dispersion of a coreactive material containing one or more carbon atoms and additionally which has at least two of certain substituent groups coreactive with the reactive groups on the latex polymer. By reactive groups is meant such groups as carboxy, sulfo, amino, hydroxyl, carboxyamido and the like. The preferred reactive latexes, suitable water-dispersible coreactive materials, and method for the preparation thereof are described more fully in U.S. 3,215,647.

Especially preferred latex foams having improved color, strength, and resiliency over that of the preferred latex foams are those comprising copolymers of at least one monomer selected from each of the three hereinafter named classes and a melamine-formaldehyde resin. Preferred monomers utilized in these especially preferred latexes are selected from the monovinylidene aromatics, the aliphatic conjugated dienes, and the $\alpha,\beta$-ethylenically unsaturated carboxylic acids or monomers hydrolyzable to such acids. Blends of the several preferred and especially preferred latexes may also be used.

By the term "monovinylidene aromatic" is meant styrene per se and substituted styrenes, especially alkyl-substituted styrenes. Generally, the alkyl substituent is a lower alkyl group, i.e., an alkyl having from 1 to 4 carbon atoms. Representative styrene compounds are styrene, alpha-methylstyrene, p-vinyltoluene, o-vinyltoluene, p-tert-butylstyrene, ar-ethylstyrene, ar-dimethylstyrene and the like.

The aliphatic conjugated diene monomers have from 4 to 10 carbon atoms and are represented by isoprene and especially 1,3-butadiene.

The carboxylic acid monomers consist of the $\alpha,\beta$-ethylenically unsaturated carboxylic acids and compounds convertible to such monomers. Representative examples are monocarboxylic acids such as acrylic acid, methacrylic acid, and ethacrylic acid; dicarboxylic acids such as maleic acid, fumaric acid, and itaconic acid; monoesters of dicarboxylic acids such as maleic half esters fumaric half esters, itaconic half esters, and mixtures of any of the above. The monomers hydrolyzable to $\alpha,\beta$-ethylenically unsaturated carboxylic acids include maleic anhydride, esters and amides of the above-named carboxylic acids especially such esters and amides of the monocarboxylic acids and also the corresponding nitriles such as acrylonitrile, methacrylonitrile, and the like.

Ordinarily the latexes for the especially preferred foams are prepared by copolymerizing at least one monomer from each of the three preferred classes of monomers in a conventional emulsion polymerization method. In some instances solution polymerization or other polymerization methods may be used with subsequent conversions of the products to latex form. According to such methods, the class of monomers which are convertible to carboxylic acids is usually copolymerized with one or more of each of the other required classes of monomers, then the conversion step (such as by hydrolysis) is carried out. Alternative to the direct copolymerization of at least one monomer from each of the three classes of monomers, a copolymer may be prepared from the styrene compounds and the aliphatic conjugated diene and onto such preformed polymer there may be polymerized by known graft polymerization methods the ethylenically unsaturated carboxylic acid or equivalent.

The melamine-formaldehyde resins utilized in preparing these especially preferred latexes are the adducts of formaldehyde and melamine of sufficiently low molecular weight to be water-dispersible and the lower alkyl ethers, especially the methyl ether, of the above described melamine-formaldehyde adducts. The etherified (or alkylated) melamine-formaldehyde adducts may be partially or fully etherified, i.e., the hydroxymethyl substituent of the adducts may be partially or substantially fully converted to lower alkyl ether groups. Also mixtures of melamine-formaldehyde adducts having varying degrees of etherification may be mixed with each other or with melamine-formaldehyde adducts having no other substituents. The term "melamine-formaldehyde resin" is intended to include materials of the above description. Descriptions and methods of preparation of materials of this type are included in the Chapter VIII, "Condensations With Formaldehyde," in Schildknecht, C. E., "Polymer Processes," High Polymers, vol. X, pp. 295–350, Interscience Publishers Inc., New York (1956). In the practice of this invention, the improvement described does not preclude the inclusion of other materials coreactive with the latex provided at least some of the melamine-formaldehyde resin is included. Examples of other suitable coreactive materials for this purpose are described in U.S. 3,215,647.

While the foams of these especially preferred latexes necessarily include at least one of the previously described copolymers and melamie-formaldehyde resins, such foams also may include other added components such as foam stabilizers, pH controlling agents, foaming aids, thickeners, antioxidants and conventional inorganic fillers, for example, clay, whiting, talc, mica, lithophone, and the like, although such are not required.

The thin cured layers of both the preferred and the especially preferred latex foams are prepared essentially according to the general procedure described in U.S. 3,215,647. Briefly described, this procedure comprises (1) frothing or foaming an aqueous blend of the desired copolymer and coreactive material, (2) casting a wet froth of the latex onto a suitable release substrate, and (3) drying and curing the froth. For the purposes of this invention, the term "release substrate" is defined as any belt, tray, or other object having a surface to which the latex foam will not adhere.

In a preferred method thin cured foam layers of the preferred and especially preferred latexes are prepared by the method described above except that the froth is cast onto a porous release belt and briefly exposed to infrared heat prior to the drying and curing step. The porosity of the belt permits the water contained in the froth to escape from the bottom portion of the froth, thus reducing the drying time considerably. Brief exposure of the froth to infrared heat prior to drying causes the skin of the froth to strengthen sufficiently to withstand the distorting forces often exerted on the froth during the drying step.

Adhesives utilized in this invention are those having dielectric loss factors higher than the thin cured slabs of latex foam. The loss factor of a composition is the product of its dielectric constant and its power factor. See Houwink, R. and Saloman, G., Adhesion and Adhesives, vol. 2, p. 144, Elsevier Publishing Company, New York (1967) for a more detailed discussion of dielectric principles as they pertain to curing of adhesive lines. It is required for the purposes of this invention that the adhesive be water-based. The suitable water-based adhesives are the latex adhesives such as the latexes of polyvinyl acetate, natural and synthetic rubber latexes, various mixtures of polyvinyl acetate latex with urea-formaldehyde concentrates, and the like. Preparation of these adhesives formulations are well known to those skilled in the art. Latex adhesives are required primarily because the cured adhesive line of a latex is not readily dissolved by either organic or aqueous solvents. Also, the cured latex line has increased elasticity over cured lines of other adhesives, thus virtually eliminating sag of the thick foam slab during compression and enhancing the resiliency of the foam slab. Furthermore, an elastic adhesive line is less likely to crack, and promote tearing or shearing of the thin layers of latex foam than a more brittle line. Preferred adhesives are the reactive synthetic latexes because of their excellent adhesion properties, durability, elasticity, color, and the like.

When selecting a suitable latex adhesive, it is desirable to choose one identical to or at least similar to the latex of the thin cured foam layers. The reason for using the identical or similar latex as the adhesive is to obtain a structure having the same or similar composition throughout in which the physical characteristics of the thin layers are not altered by the adhesive line or lines.

If any other ingredients such as filler, antioxidant, thickeners, and the like are present in the thin layers, it may also be desirable to include an equivalent amount in the adhesive formulation.

The process of this invention is applicable to virtually all thin cured layers of latex foam prepared by whatever method. However, the thin slabs of latex foam utilized are preferably those prepared by passing a continuous layer of the wet latex froth having a uniform thickness in the range of from about 1/32 to about 2 inches, preferably 1/2 to 1 inch, on a suitable release substrate through a suitable curing apparatus. In the case of natural latex and the non-reactive synthetic latexes, the release substrate may be a non-porous belt or tray, but preferably is a porous belt which will permit the passage of water vapor from the bottom portion of the froth. Such a belt or other structure must have a surface to which the latex foam will not adhere. In the case of the preferred latexes the release substrate is a porous belt or other porous structure usually coated with a special releasing material which permits the easy removal of the reactive latex foam, preferably the coating material is poly(tetrafluoroethylene).

Apparatus suitable for curing the material or non-reactive latexes are conventional ones wherein the froth is gelled, vulcanized, washed, squeezed, and dried. If a porous substrate is used, the curing apparatus is primarily a vulcanizing and a drying means. A drying means is all that is required to cure the preferred and especially preferred latexes, preferably the drying means is a hot air circulating oven.

The thin cured layers of latex foam may be adjoined together in the form of continuous layers or in the form of slabs cut to predetermined dimensions. It is necessary that the thin cured layers be adjoined in a sandwich-like fashion such that a layer of latex adhesive appears at each interface of the thin layers. In one embodiment a thin continuous layer of latex foam is cut into slabs of predetermined dimensions. An initial slab is then placed on a suitable support, and a second slab coated on at least one surface with a latex adhesive is placed upon the initial slab in such a manner that the adhesive layer is between the two slabs. Subsequent slabs are similarly coated and placed upon the preceding slab until the desired thickness is reached. Application of the adhesive may be accomplished by roll coating, brushing, dipping and the like. Preferably, the second and subsequent slabs are coated by passing each slab over a roller carrying the adhesive. In coating the thin slabs with adhesive, it is desirable to apply a layer having a uniform thickness.

The thick slab having a sandwich construction is then passed into a dielectric heating apparatus to cure the adhesive lines. Dielectric heat is a critical requirement of this process since it provides a quick curing means and does not subject the foam to excessive heat. When the adhesive is cured by another heating means, i.e., hot air circulating oven, the time required to cure is about the same as that required to cure a layer of wet froth of the same thickness. Also the prolonged heating required causes the exterior portion of the foam to deteriorate. Curing by dielectric heat is completed when water passes from the layered slab as indicated by a voltmeter connected to the dielectric heating apparatus.

Slabs having thicknesses up to 8 inches are readily prepared by this method, and even greater thicknesses are possible if the particular dielectric apparatus utilized has sufficient capacity to accommodate the thicker slab. Practically speaking, however, slab thicknesses greater than 8 inches are rarely required.

The following examples are given to more clearly illustrate the invention, not to limit its scope. Throughout this specification and claims, all parts and percentages are by weight unless otherwise indicated.

Example 1

Thin cured layers of latex foam were first prepared as follows: A wet latex foam formulation was prepared at 69 percent solids from the following ingredients:

| | Parts dry weight |
|---|---|
| Butadiene/styrene copolymer [1] | 100.0 |
| Melamine-formaldehyde resin [2] | 7.5 |
| Sodium lauryl sulfate | 2.0 |
| Calcium carbonate | 100.0 |
| Methyl cellulose | .25 |

[1] Copolymer containing the following monomers in parts by weight based on the copolymer:

| Butadiene | 70.7 |
|---|---|
| Styrene | 27.5 |
| Acrylic acid | 1.25 |
| Itaconic acid | 0.55 |

[2] A water soluble mixture of partially methylated, low molecular weight melamine-formaldehyde adducts having an average of about 0.8 mole of methylol groups and about 1.8 moles of methoxymethyl groups for each mole of melamine. The melamine resins were premixed before adding to the latex. In order to obtain a more intimate mixture the formulation was thoroughly agitated after each ingredient was added. The formulation was converted into a wet froth by pumping the formulation through an Oakes continuous frothing machine. At this point the wet froth was cast on a Teflon-coated fiberglass release belt (Fluorglas fabric M-384-25/1, Cadillac Plastics Company) and the froth was doctored to an average thickness of 1/2 inch. The wet froth was passed under infrared heaters for a period of 30 seconds and was then passed into a 350° F. hot air circulating oven for a period from 10 to 13 minutes.

The thin slabs of cured foam were cut to predetermined lengths and fed directly into an adhesive application machine containing the adhesive formulation prepared at 69 percent/solids from the following ingredients:

| | Parts dry weight |
|---|---|
| Butadiene/styrene copolymer [1] | 100.0 |
| Melamine-formaldehyde resin [1] | 7.5 |
| Calcium carbonate | 75.0 |
| Methyl cellulose | 0.25 |

[1] Same as in foam formulation.

The thin slabs having one surface coated with latex were stacked one upon another until the desired thickness was reached and then passed through a dielectric heating apparatus having 2 (2' x 2') platens. The drying times required for various thick slabs each having a different number of adhesive lines are shown in the following table.

TABLE I

| No. of adhesive line | Rate (ft./min.) | Rate (ft.²/min.) | Amps | Kw.-hr./ft.² |
|---|---|---|---|---|
| 1 | 6.6 | 13.2 | .39 | .0095 |
| 3 | 4.9 | 9.8 | 1.12 | .0245 |
| 7 | 1.7 | 3.4 | 2.58 | .1382 |

What is claimed is:

1. A process for preparing a thick slab of latex foam, said thick slab comprising a plurality of thin layers of latex foam intimately adhered together with a latex adhesive, said process comprising the steps of (1) adjoining the thin layers in sandwich-like fashion such that a layer of the latex adhesive appears at each interface of the thin layers and (2) removing water from the latex adhesive by a dielectric heating means.

2. The process according to claim 1 wherein the thin layers of the latex foam are prepared by a process including the steps of (1) casting a wet froth of the latex onto a porous release substrate and (2) curing and drying the froth.

3. The process according to claim 1 wherein the latex comprises (1) a polymer having at least one pendant reactive substituent group and (2) a water-dispersible material containing one or more carbon atoms and having at least two substituted groups coreactive with the reactive groups on the polymer.

4. The process according to claim 3 wherein the pendant reactive substituent group is a hydroxyl group.

5. The process according to claim 3 wherein the polymer is a copolymer comprising a monovinylidene aromatic monomer, an aliphatic conjugated diene monomer having from 4 to 10 carbon atoms, and an $\alpha,\beta$-ethylenically unsaturated carboxylic acid.

6. The process according to claim 5 wherein the monovinylidene aromatic monomer is styrene, the diene monomer is 1,3-butadiene, and the carboxylic acid monomer is acrylic acid.

7. The process according to claim 5 wherein at least a portion of the carboxylic acid monomer is itaconic acid.

8. The process according to claim 3 wherein the coreactive material is a melamine-formaldehyde resin.

9. The process according to claim 4 wherein the thin cured foam layers are prepared by (1) casting a wet froth of the latex onto a porous release substrate and (2) curing the froth in a drying apparatus.

10. The process according to claim 4 wherein the thin cured foam layers are prepared by (1) casting a wet froth of the latex onto a porous release substrate coated with polytetrafluoroethylene and (2) curing the froth in a hot air circulating oven.

11. The process according to claim 1 wherein the thin layers are adjoined by (1) placing a thin cured layer of latex foam cut to predetermined dimensions on a substrate, (2) coating at least one surface of at least one other thin cured layer also cut to predetermined dimensions with a layer of a latex adhesive, and (3) placing at least one of the coated slabs upon the first slab in a sandwich-like fashion such that an adhesive layer appears at each interface of the thin layers.

References Cited

UNITED STATES PATENTS

| | | | |
|---|---|---|---|
| 3,010,157 | 11/1961 | Cizek | 156—273 |
| 3,053,712 | 9/1962 | Grabowski | 156—308X |
| 3,060,513 | 10/1962 | Klink et al. | 156—273 |
| 3,215,647 | 11/1965 | Dunn | 260—23 |

BENJAMIN R. PADGETT, Primary Examiner

E. E. LEHMANN, Assistant Examiner

U.S. Cl. X.R.

156—78; 219—10.71, 10.53